(12) United States Patent
Paul

(10) Patent No.: US 6,463,566 B1
(45) Date of Patent: Oct. 8, 2002

(54) DYNAMIC DOUBLE SAMPLING CHARGE INTEGRATOR

(75) Inventor: Susanne A. Paul, Austin, TX (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 09/497,985

(22) Filed: Feb. 4, 2000

(51) Int. Cl.[7] .............................................. G06F 17/50

(52) U.S. Cl. ............................................. 716/1; 716/2

(58) Field of Search ................................ 327/91, 92, 93, 327/94, 95, 96, 284, 554; 323/312; 716/1–2; 348/222, 250, 294–300, 308

(56) References Cited

U.S. PATENT DOCUMENTS

| | | | |
|---|---|---|---|
| 3,806,772 A | | 4/1974 | Early |
| 4,209,853 A | * | 6/1980 | Hyatt ............................ 367/8 |
| 5,247,241 A | * | 9/1993 | Ueda ........................... 323/312 |
| 5,736,757 A | | 4/1998 | Paul |
| 5,748,235 A | * | 5/1998 | Kondo et al. ................ 348/222 |
| 5,872,469 A | * | 2/1999 | Nestler .......................... 327/91 |
| 5,969,758 A | * | 10/1999 | Sauer et al. ................. 348/241 |
| 5,982,205 A | * | 11/1999 | Vallancourt ................... 327/94 |
| 6,025,935 A | * | 2/2000 | Tseng .......................... 348/294 |
| 6,118,482 A | * | 9/2000 | Clark et al. .................. 348/181 |
| 6,133,954 A | * | 10/2000 | Jie et al. ...................... 438/308 |
| 6,147,551 A | * | 11/2000 | Hong ............................ 327/554 |
| 6,320,617 B1 | * | 11/2001 | Gee et al. .................... 348/302 |
| 6,366,320 B1 | * | 4/2002 | Nair et al. .................... 348/300 |

OTHER PUBLICATIONS

"A Distributed Floating–Gate Amplifier in Charge–Coupled Devices" by wen et al., ISSCC 75/ Wednesday, Feb. 12, 1975.

* cited by examiner

Primary Examiner—Matthew Smith
Assistant Examiner—Paul Dinh
(74) Attorney, Agent, or Firm—Samuels, Gauthier & Stevens, LLP

(57) ABSTRACT

A charge processing circuit which integrates charge at an output node that is representative of an input charge provided at an input node. The circuit includes a precharge path coupled to the input node, the precharge path operable for setting the potential of the input node to a fixed precharge potential prior to introduction of input charge to the input node. A sensing path is coupled to the input and output nodes which is operable for returning the potential of the input node to the fixed precharge potential subsequent to introduction of input charge to the input node. A feedback element has an input coupled to the sensing path and the precharge path, the feedback element operable for setting said fixed precharge potential. In another embodiment there is provided a method of integrating charge at an output node of a charge processing circuit that is representative of input charge provided at an input node. The method includes replenishing charge at the input node; draining charge from the input node; stopping the draining of charge from the input node in response to a feedback element detecting when the input node reaches a fixed precharge potential; introducing an input charge on the input node from a source; draining charge from the input node onto the output node; and stopping the draining of charge from the input node in response to a feedback element detecting when the input node reaches the fixed precharge potential.

9 Claims, 15 Drawing Sheets

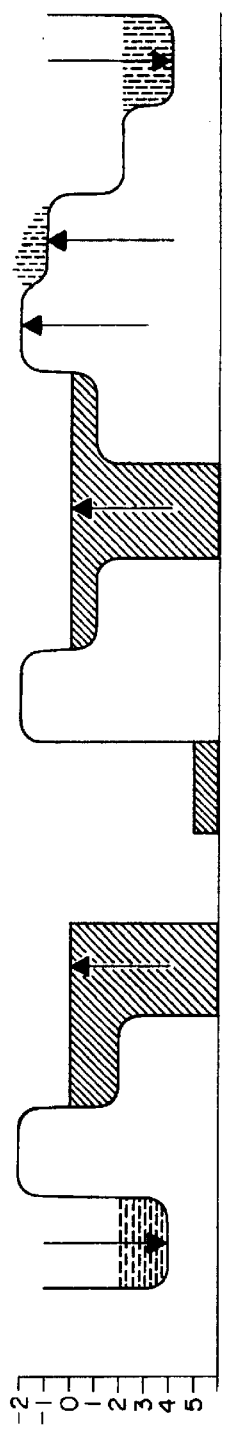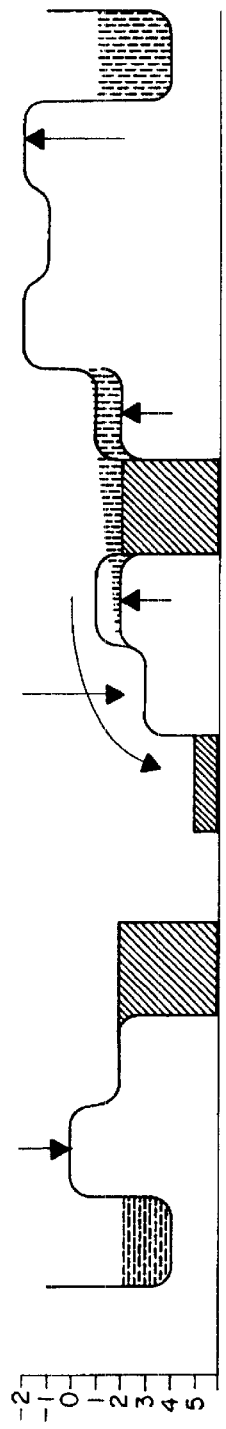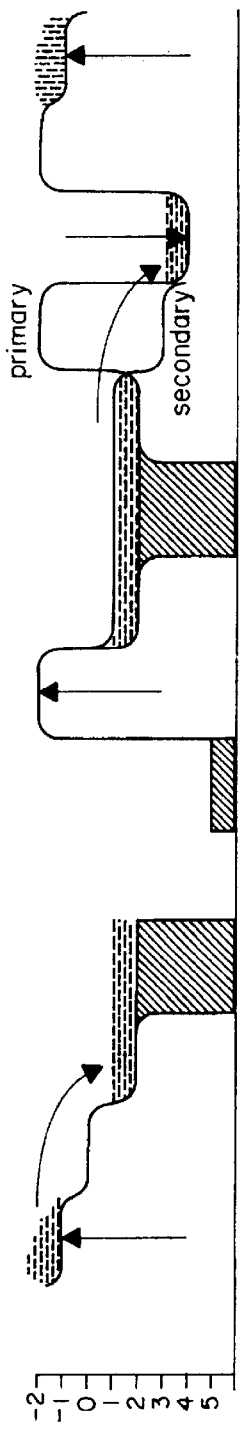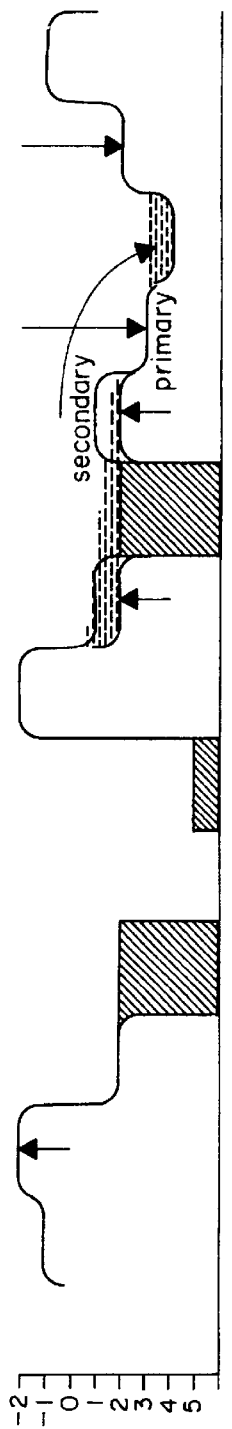
FIG. 6B
FIG. 6C
FIG. 6D
FIG. 6E

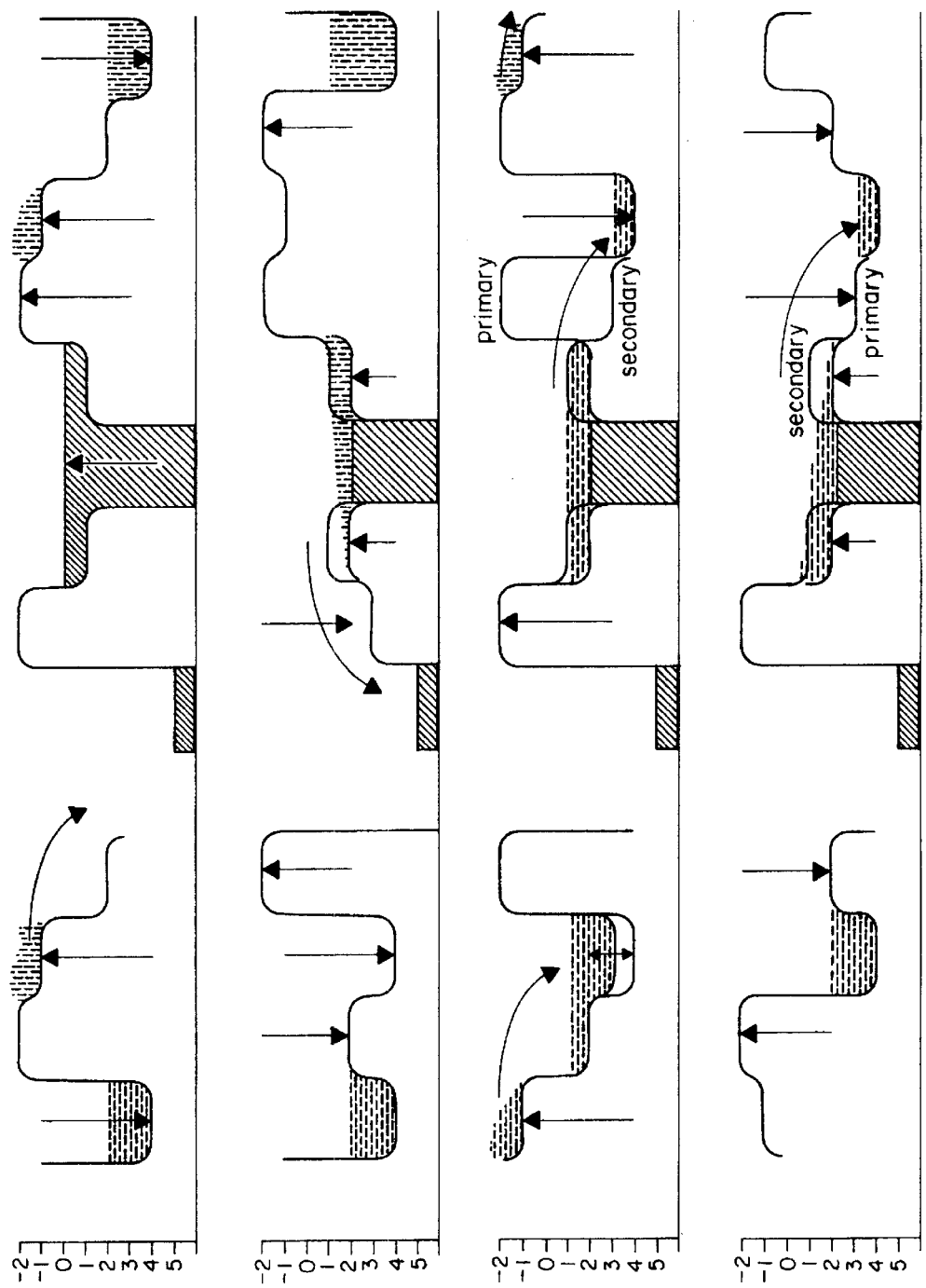

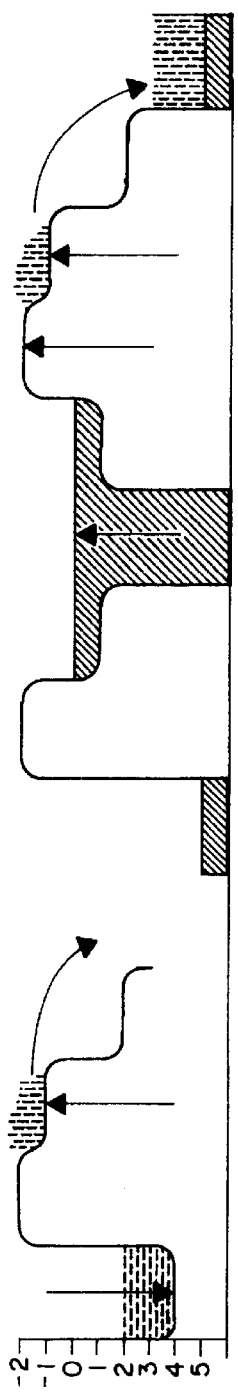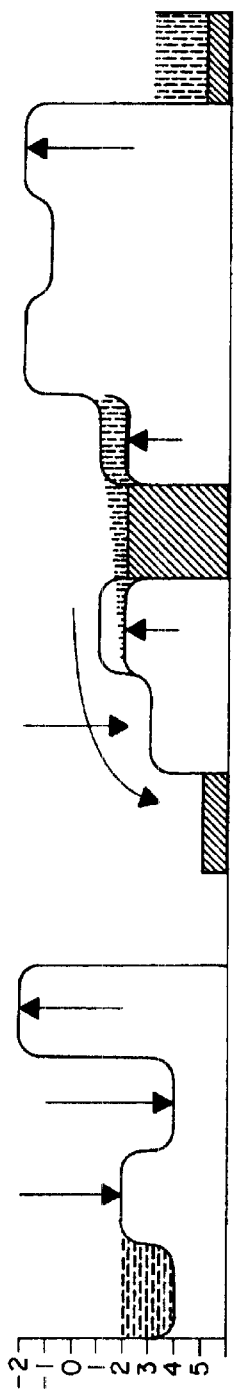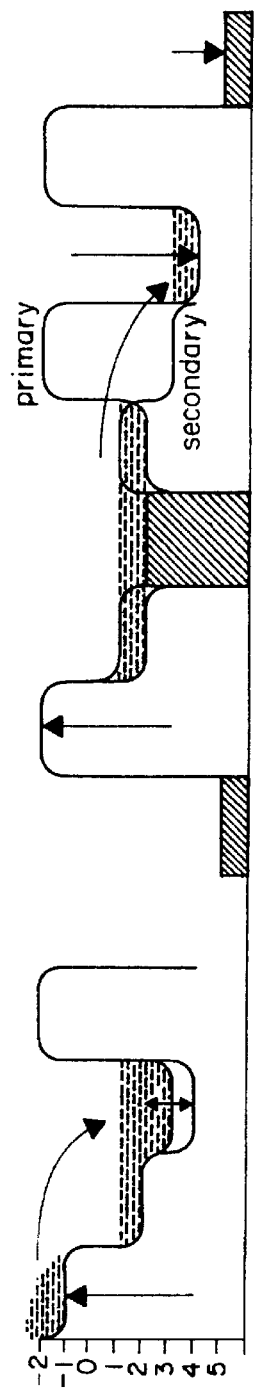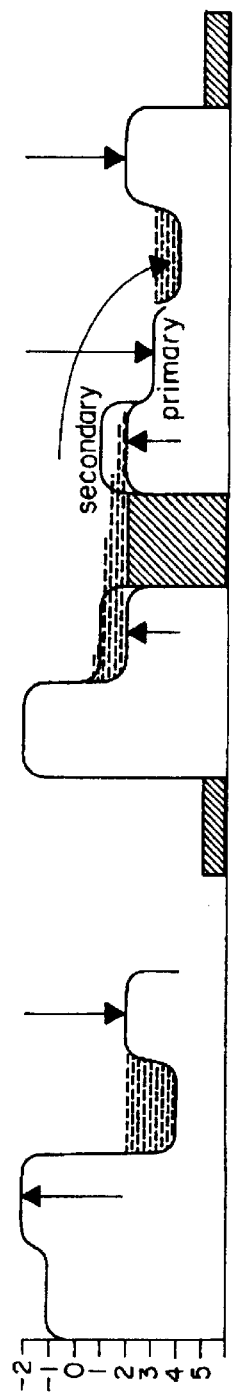
FIG. 8B
FIG. 8C
FIG. 8D
FIG. 8E

DYNAMIC DOUBLE SAMPLING CHARGE INTEGRATOR

SPONSORSHIP INFORMATION

This invention was made in part with funding from the U.S. Air Force under Contract No. F19628-95-C-0002. The government has certain rights in the invention.

BACKGROUND OF THE INVENTION

The invention relates to the field of charge integrating devices.

Charge generation is necessary whenever CCD signal processing circuitry must interface with voltage-domain signals. A variety of techniques are well known for generating charge packets from voltages. In all of these, an input diffusion is used to provide a source of electrons and the amount of charge that is collected from this source is controlled by either the source potential or the voltages on an initial set of register gates.

The surface channel fill-and-spill technique, shown diagrammatically in FIG. 1, is the most commonly used method of charge generation. FIG. 1A is a schematic diagram of a conventional fill-and-spill charge generator circuit 100, and FIGS. 1B–1E are associated potential diagrams for a second, third, fourth and first phase, respectively. In this approach, the input signal $v_s$ is provided to gate $G_2$ and a fixed reference level $V_r$ is placed on $G_1$. During the fill phase in FIG. 1B, node $f_g$ is pulsed low and charge is injected into the channel regions underneath $G_1$ and $G_2$. During the spill phase in FIG. 1C, $f_g$ is returned to a high potential so that excess charge from the output well spills back. The spill transition occurs rapidly at first, but then slows considerably as it nears completion. The long time constant associated with this spill transition limits the speed at which the fill-and-spill circuit can be operated. In addition to its limited speed, the fill-and-spill technique has the disadvantages that it provides poor linearity and does not perform accurate sampling.

Charge-domain signals can be used by non-CCD elements in two ways. The first method, referred to as destructive sensing, involves transferring the charge packet onto a receiving element. In this case, the charge packet is consumed by the operation. The second method, referred to as nondestructive sensing, involves creating a separate representation of the charge packet, without altering the original, so that multiple nondestructive operations can be performed on the same charge packet.

A schematic diagram of a conventional nondestructive floating gate amplifier circuit 200 is illustrated in FIG. 2A. FIGS. 2B–2E are associated potential diagrams for a first, second, third and fourth phase, respectively. The circuit includes a sensing gate $G_4$ within a CCD channel. The sensing gate and the barrier that precedes it are not clocked. In preparation for receiving charge, node $v_g$ is preset to the intermediate bias level $V_h$ during the time that the $G_4$ channel is empty. The precharge is then turned off and $v_g$ is left floating. During the next phase, a charge packet is transferred underneath $G_4$ by lowering the voltages on $G_1$ and $G_2$. As charge collects underneath $G_4$, it couples through the gate-to-channel capacitance and causes the potential on $v_g$ to fall. The clocked $v_g$ waveform is then buffered to form the voltage-domain output $v_b$.

This approach to charge sensing has the disadvantage that nonlinearity is introduced by voltage dependence of its various capacitances. It also is not compatible with low voltage operation. because unclocked CCD gates, $G_3$ and $G_4$, reside in the charge transfer path. Finally this circuit provides only a limited signal range before charge collects underneath $G_3$ and is not sensed by the floating gate.

SUMMARY OF THE INVENTION

Accordingly, the invention provides a charge processing circuit which integrates charge at an output node that is representative of an input charge provided at an input node. The circuit includes a precharge path coupled to the input node, the precharge path operable for setting the potential of the input node to a fixed precharge potential prior to introduction of input charge to the input node. A sensing path is coupled to the input and output nodes which is operable for returning the potential of the input node to the fixed precharge potential subsequent to introduction of input charge to the input node. A feedback element has an input coupled to the sensing path and the precharge path, the feedback element operable for setting said fixed precharge potential.

In accordance with another embodiment of the invention, there is provided a method of integrating charge at an output node of a charge processing circuit that is representative of input charge provided at an input node. The method includes replenishing charge at the input node; draining charge from the input node; stopping the draining of charge from the input node in response to a feedback element detecting when the input node reaches a fixed precharge potential; introducing an input charge on the input node from a source; draining charge from the input node onto the output node; and stopping the draining of charge from the input node in response to a feedback element detecting when the input node reaches the fixed precharge potential.

BRIEF DESCRIPTION OF THE DRAWINGS

FIGS. 6B–6E are associated energy level diagrams for a fill phase, spill phase, collection phase and sensing phase, respectively;

FIGS. 7B–7E are associated energy level diagrams for a fill phase, spill phase, collection phase and sensing phase, respectively;

FIGS. 8B–8E are associated energy level diagrams for a fill phase, spill phase, collection phase and sensing phase, respectively.

DETAILED DESCRIPTION OF THE INVENTION

Speed and linearity are improved for a dynamic double-sampling (DDS) technique in accordance with the invention by turning off spill and sensing transitions before they enter subthreshold, and by sensing charge over a time-varying, rather than a static, cascode barrier. At the same time, the useful operating range is increased to nearly the full scale and the impact of spill and sensing clock jitter is reduced. Parasitic capacitor voltage dependence is decreased as well.

Figure 1A:
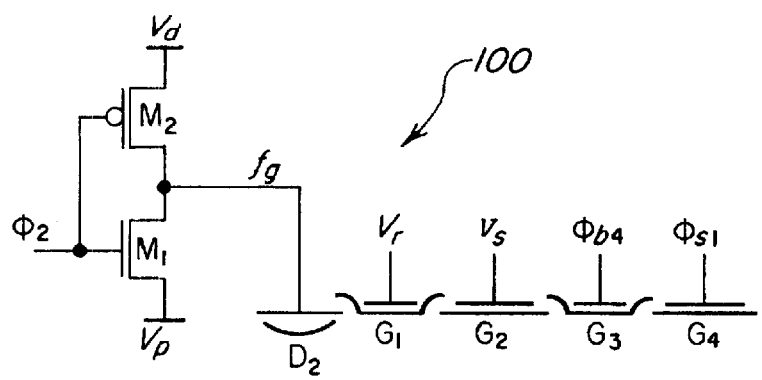
FIG. 1A is a schematic diagram of a conventional fill-and-spill charge generator circuit.
Figure 1B:
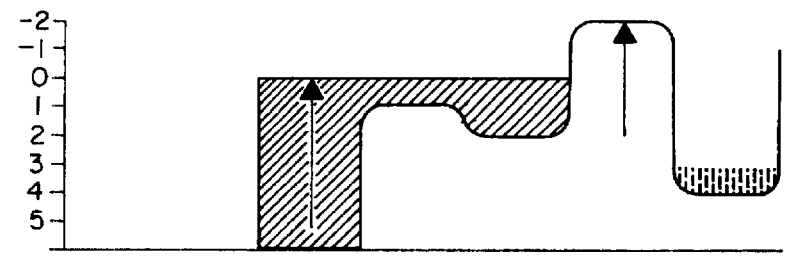
FIGS. 1B–1E are associated potential diagrams for a second, third, fourth and first phase, respectively.
Figure 1C:
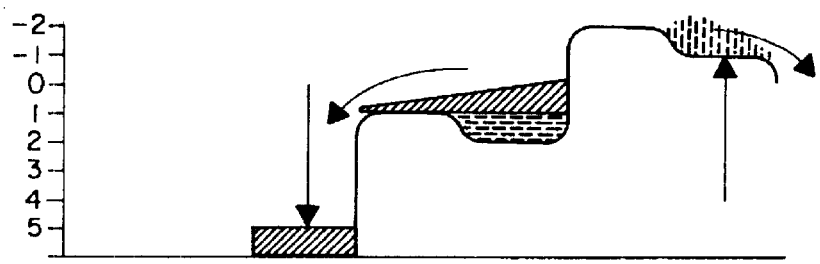
Figure 1D:
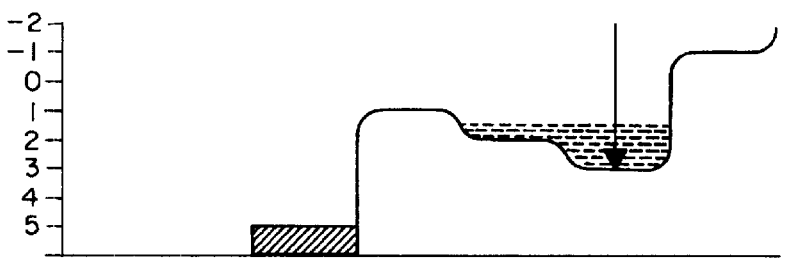
Figure 1E:
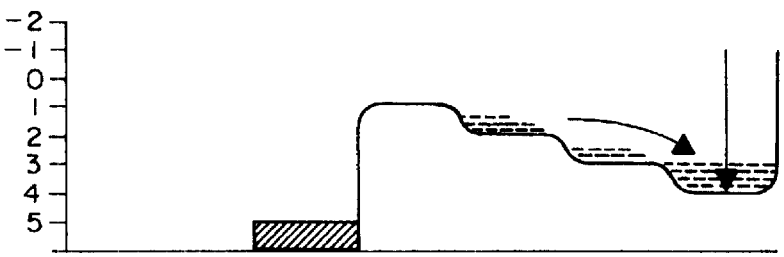
Figure 2A:
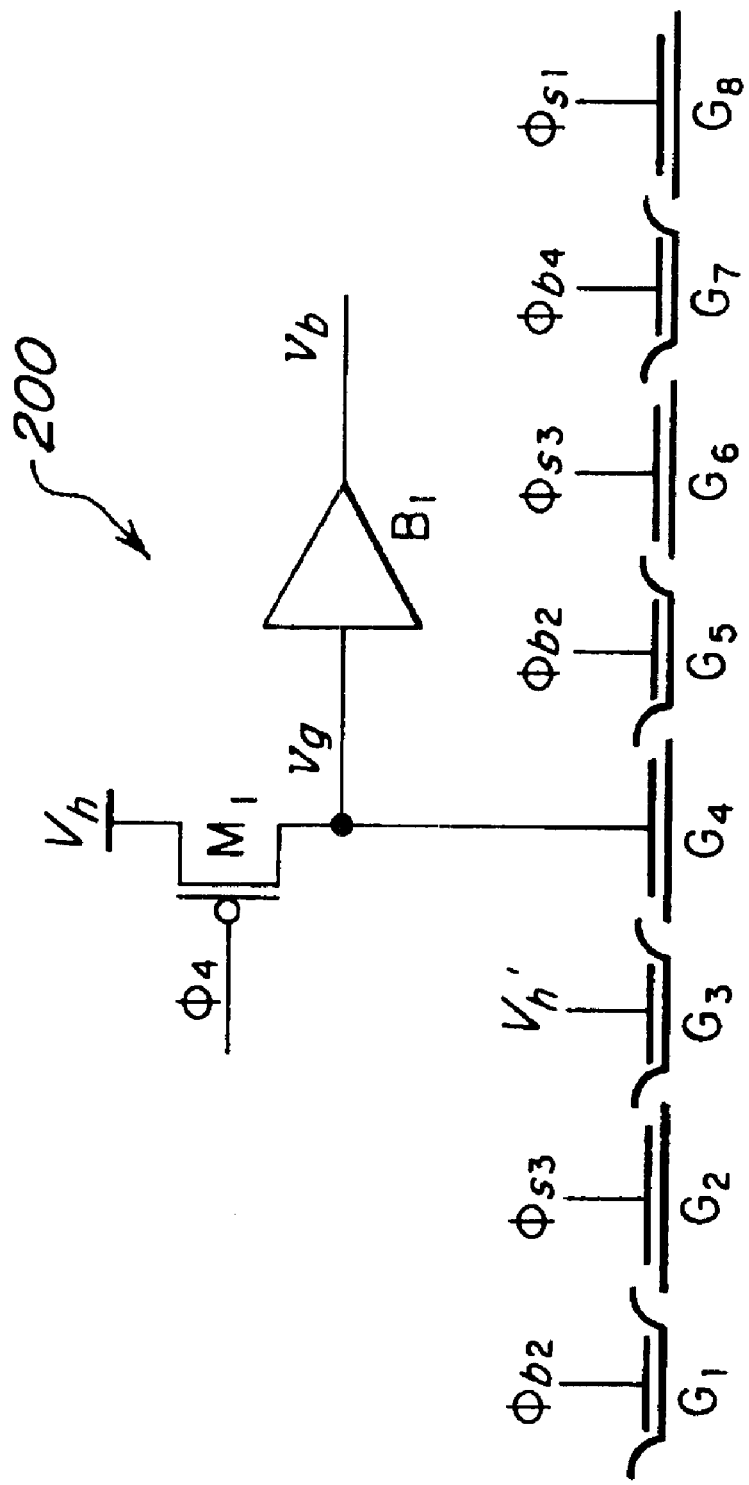
FIG. 2A is a schematic diagram of a conventional nondestructive floating gate amplifier circuit.
Figures 2B, 2C, 2D, 2E:
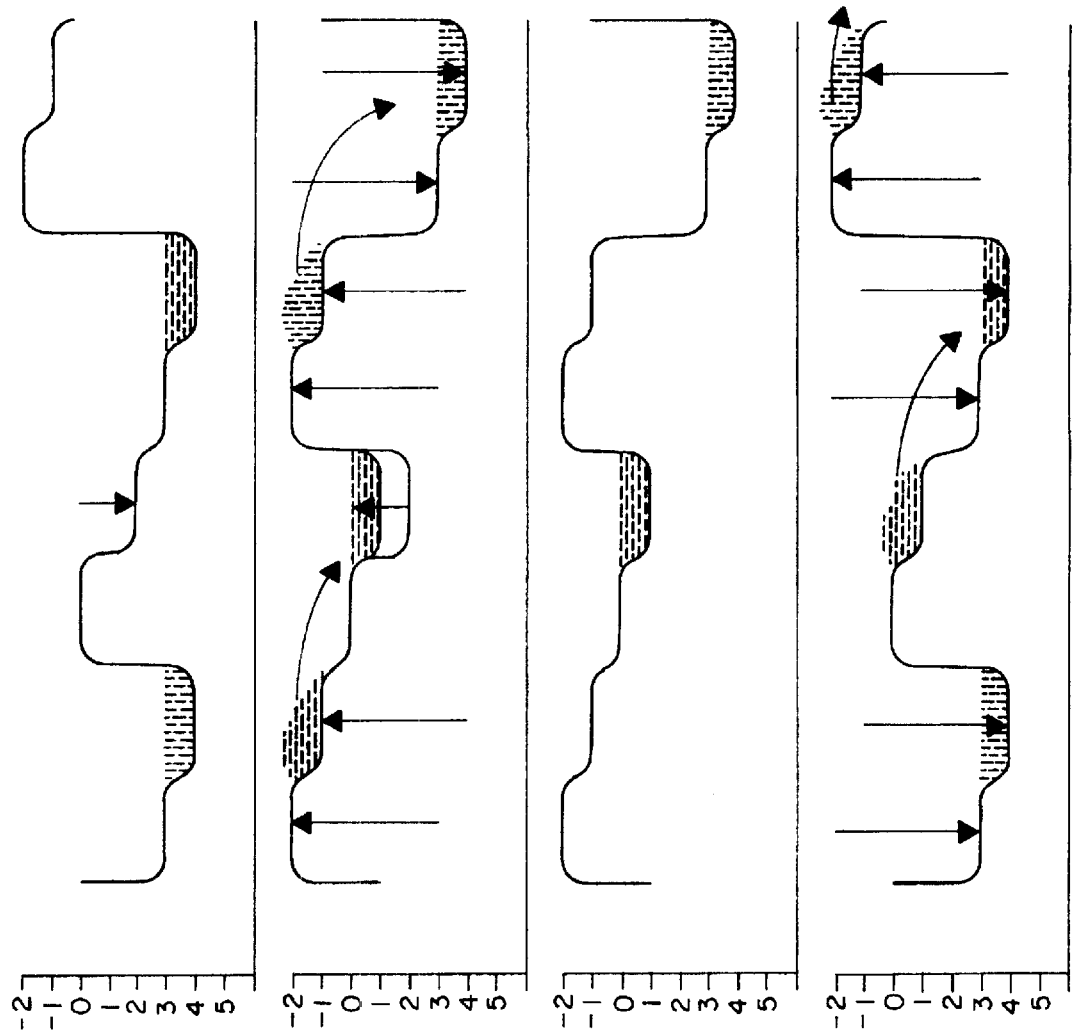
FIGS. 2B–2E are associated potential diagrams for a first, second, third and fourth phase, respectively.
Figure 3A:
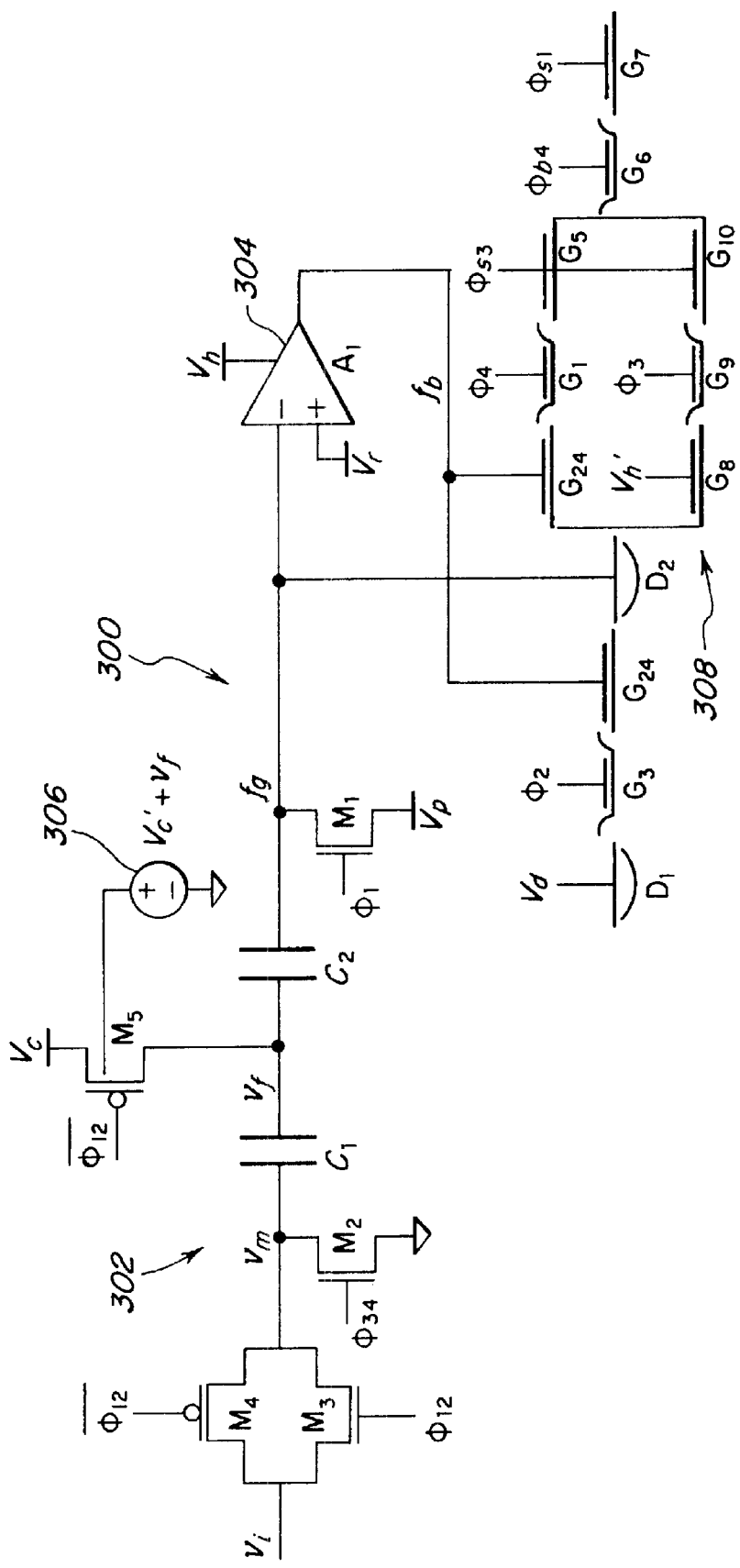
FIG. 3A is a schematic diagram of an exemplary embodiment of a DDS charge generator in accordance with the invention.
Figures 3B, 3C, 3D, 3E:
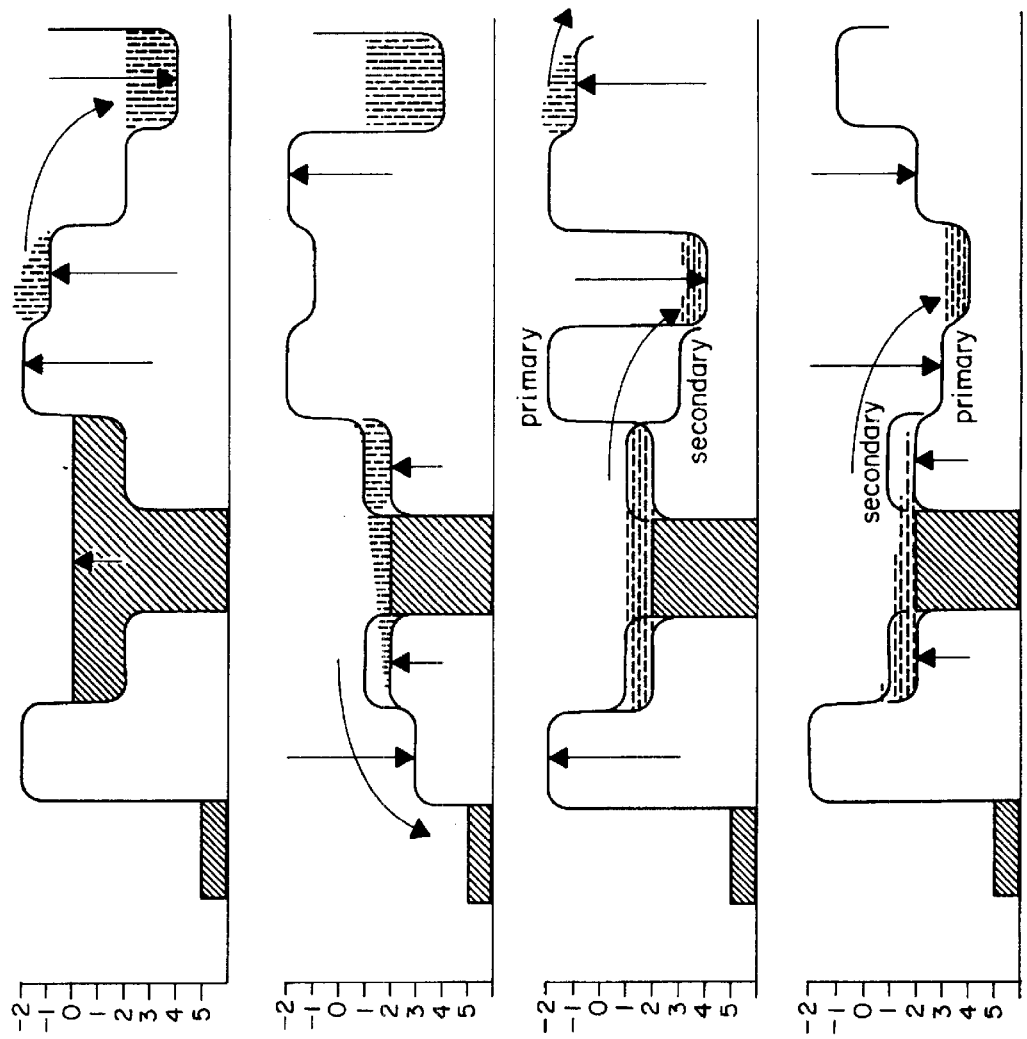
FIGS. 3B–3E are associated energy level diagrams for a fill phase, a spill phase, a collection phase and a sensing phase, respectively.

FIG. 3A is a schematic diagram of an exemplary embodiment of a DDS charge generator 300 in accordance with the invention. FIGS. 3B–3E are associated energy level diagrams for a fill phase, a spill phase, a collection phase and a sensing phase, respectively. The primary voltage-mode portion of this circuit is the sample-and-hold stage 302 formed from capacitors $C_1$ and $C_2$ and transistors $M_3$, $M_4$, $M_2$, and $M_5$. In addition, there is a feedback amplifier $A_1$ (304) that computes the difference between $f_g$ and the fixed reference voltage, $V_r$. A signal-dependent voltage source 306, which drives the bulk of $M_5$, is also included. Other circuit elements operate in the charge domain.

A series of precharge transistors connect capacitor $C_2$ to the diffusion $D_1$ and a series of sensing transistors connect it to an output well, $G_5$. Two gates, both labeled $G_{24}$, are shown on either side of an input diffusion $D_2$. These elements are shown as separate gates in the figure, but can also be implemented as a single gate. A secondary static sensing path 308, formed from $G_8$, $G_9$, and $G_{10}$, is located between the input diffusion and the output well. Its cascode gate $G_8$ is tied to the fixed bias $V_h'$.

Figures 4A, 4B, 4C, 4D, 4E:
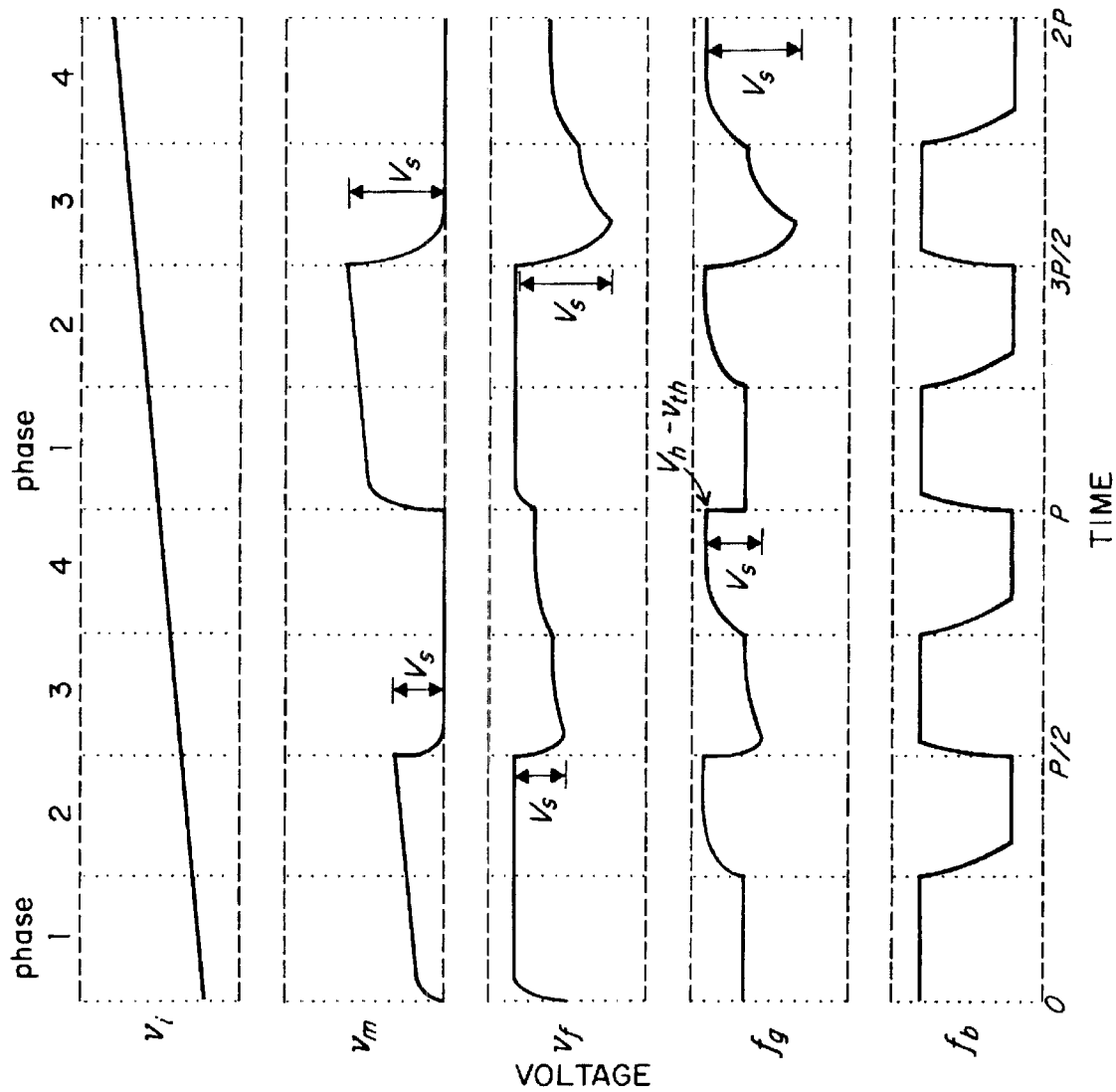
FIGS. 4A–4E are voltage waveforms for a sample-and-hold portion for the example of a linear input ramp for a DDS charge generator.
Figure 5A:
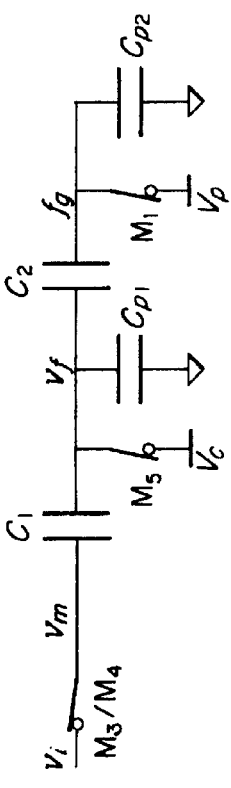
FIGS. 5A–5D are simplified linear models of a DDS charge generator in accordance with the invention, during each of the four phases: a fill phase, spill phase, collection phase and sensing phase, respectively.
Figure 5B:
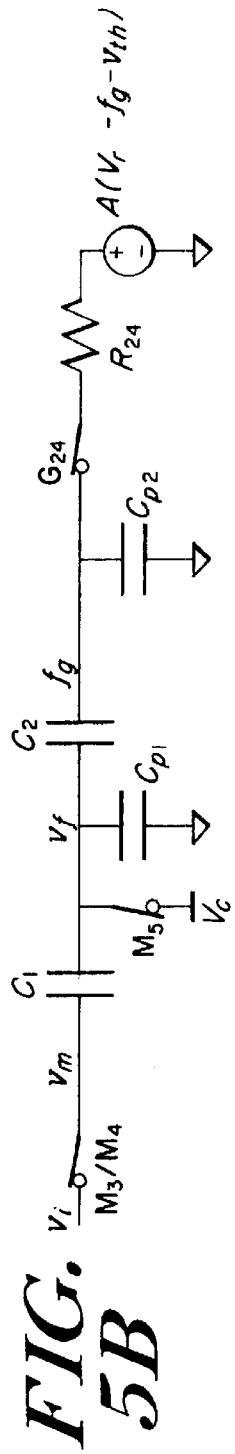
Figure 5C:
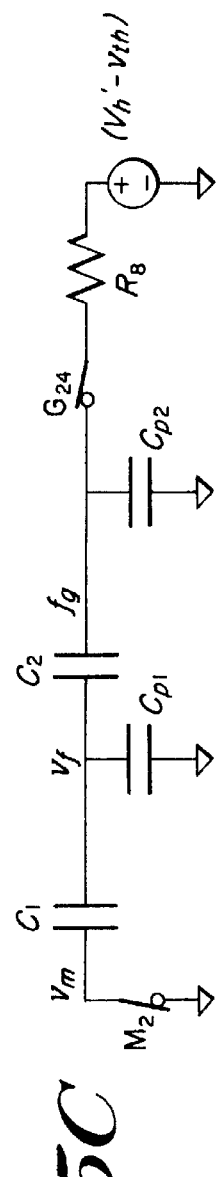
Figure 5D:
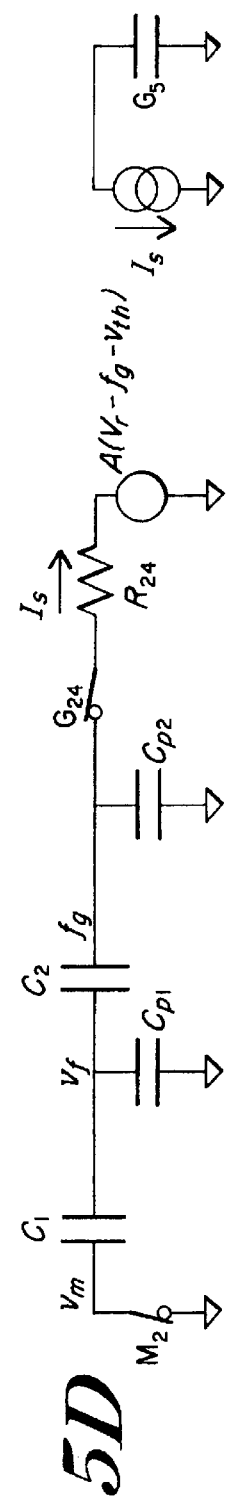

The following description of circuit operation references three figures. First, energy level diagrams for the charge-domain portion are provided in FIGS. 3B–3E. Second, voltage waveforms for the sample-and-hold portion are included in FIGS. 4A–4D for the example of a linear input ramp. Exemplary voltage waveforms for a DDS charge generator, signals $v_i$, $v_m$, and $v_f$ are shown in FIGS. 4A–4C, and signals $f_g$ and $f_b$ follow identical paths during phases 2 and 4 as shown in FIGS. 4D–4E.

FIGS. 5A–5D are simplified linear models of a DDS charge generator in accordance with the invention, during each of the four phases: a fill phase, spill phase, collection phase and sensing phase, respectively. Capacitor $C_{p1}$, included in this model, represents parasitic junction and routing capacitances on node $v_f$. Capacitor $C_{p2}$ models capacitance of the cascode channel, underneath $G_{24}$ and $G_8$, as well as parasitic junction and routing capacitances on $f_g$. Saturation and subthreshold modes of $G_{24}$ are modeled by resistor $R_{24}$ in series with a voltage source. The value of this voltage source is $(A(V_r-f_g)-V_{th})$, where A represents the amplifier gain. This simple model provides a qualitatively accurate description of circuit operation.

Phase 1 is referred to as the fill phase. Signal $v_m$ tracks the ramp on the analog input $v_i$ and the intermediate node $v_f$ is clamped to the bias $V_c$. When the sensing node $f_g$ is pulled low, to $V_p$, the region underneath $G_{24}$ is flooded with charge, and electrons consumed during the previous generation cycle are replenished. The charge packet underneath $G_5$, which was generated during the previous cycle, is transferred forward upon the transition of $G_1$ and $G_5$ to ground. Charge can not flow backward during this transfer because of the built-in threshold offset between barrier and storage gates.

Phase 2 is the spill phase. $M_1$ is turned off and $f_g$ is left floating. Initially, the voltage on $f_g$ is much lower than that on $V_r$ and the amplifier output $f_b$ is saturated at its high level, $V_h$. After the potential on $G_3$ is raised and the precharge path is enabled, electrons flow from $f_g$ to the drain, $V_d$. Current flow is determined by the value of $(f_b-f_g)$, the gate-to-source voltage of $G_{24}$. Initially, this voltage is large, $G_{24}$ is in saturation, and the voltage on $f_g$ rises rapidly. However, as $f_g$ rises, currents are reduced and the process slows considerably. Once $f_g$ approaches $V_r$, the amplifier output falls and $G_{24}$ transitions quickly through subthreshold and is shut off.

For simplicity in the analysis below, the amplifier is modeled with a linear transfer characteristic, and its saturation at high and low levels is ignored. The value of $f_g$ as a function of time during the spill process is $$f_g(t) = V_p e^{-(t-H)/\tau_2} + \left(\frac{AV_r - V_{th}}{A+1}\right)(1 - e^{-(t-H)/\tau_2}) \quad H \leq t \leq 2H. \quad (1)$$

A comparison between the time constant $$\tau_2 = \frac{R_{24}(C_{p2} + C_2)}{(A+1)} \quad (2)$$

for this operation with that in a circuit with fb held at a constant value shows that the time constant for the circuit is a factor of (A+1) times faster, and the incomplete portion of the transition in Eq. (1) is attenuated by a factor of $e^{A+1}$.

To a very good approximation, the precharge path is completely shut off for the remainder of the cycle with fg floating at a level of $$f_g(2H) = \left(\frac{AV_r - V_{th}}{A+1}\right). \quad (3)$$

The final voltage on $f_b$ is $$f_b(2H) = \left(\frac{A}{A+1}\right)(V_r + v_{th}). \quad (4)$$

Nodes $v_m$ and $v_f$ are actively driven during this phase and are not impacted by the transition on $f_g$. At the end of phase 2 they have values $$v_m(2H) = v_i(2H) = V_s \quad (5)$$

and $$v_f(2H) = V_c. \quad (6)$$

Variable $V_s$ is used to refer to the analog input $v_i$ at the end of the sampling operation, at time 2H.

Phase 3 is referred to as the collection phase. $G_5$ is raised in anticipation of receiving charge and the precharge path is closed by lowering $G_3$. Meanwhile $v_m$, which was previously tied to the analog input, is clamped to ground. The falling transition on $v_m$, $$v_m(2H+\Delta) - v_m(2H) = -V_s, \tag{7}$$

is assumed to complete during a short time, $\Delta$. It couples through $C_1$ and $C_2$ onto $v_f$ and $f_g$. Node $v_f$ falls toward a final voltage of $$v_f(2H+\Delta) = V_c - V_s K_1, \tag{8}$$

where the unitless constant $K_1$ is defined as $$K_1 = \frac{C_1}{\left(C_{pl} + \frac{C_2 C_{p2}}{C_2 + C_{p2}} + C_1\right)}. \tag{9}$$

The voltage on $f_g$ also falls from its precharged level to $$f_g(2H+\Delta) = f_g(2H) - V_s K_1 \frac{C_2}{(C_2 + C_{p2})}. \tag{10}$$

The channel capacitance of $G_{24}$ is included in $C_{p2}$ because charge fills this region during both the fill and collection phases.

For optimum performance, the amplifier should remain saturated at its high level $V_h$ during the entire collection phase. To assure this condition, the input signal range is limited to $$V_s > \left(\frac{v_{th}}{A+1} - \frac{V_r}{A(A+1)}\right)\left(\frac{C_2 + C_{p2}}{C_2 K_1}\right). \tag{11}$$

Meanwhile, the potential on $G_9$ is high and the secondary sensing path through $G_8$ and $G_9$ is open. The voltage on $f_g$ rises toward the channel potential underneath $G_8$. Eventually $G_8$ enters subthreshold and current gradually ceases. The rising transition on $f_g$ during this time is described by $$f_g(t) = \left(f_g(2H) - V_s K_1 \frac{C_2}{(C_2 + C_{p2})}\right) e^{-(t-2H)/\tau_3} + (V_h' - v_{th}')(1 - e^{-(t-2H)/\tau_3}) \ 2H \le t \le 3H, \tag{12}$$

where the time constant $\tau_3$ is $$\tau_3 = R_8\left(C_{p2} + \frac{C_2(C_1 + C_{pl})}{C_1 + C_2 + C_{pl}}\right). \tag{13}$$

The final phase, phase 4, is referred to as the sensing phase. The sensing path is enabled by raising the voltage on $G_1$. Immediately thereafter, any charge remaining on $f_g$ from the collection phase is transferred to the output well. The resulting transition on $f_g$ is similar to that during the spill phase. The amplifier output $f_b$ is originally clamped at its high level, $V_h$. Current flow, determined by $(f_b - f_g)$, slows as $f_g$ approaches $V_r$. Once fb begins to fall, $G_{24}$ transitions rapidly through subthreshold and is shut off.

The value of $f_g$ as a function of time is given by $$f_g(t) = f_g(3H)e^{-(t-3H)/\tau_4} + \left(\frac{AV_r - v_{th}}{A+1}\right)(1 - e^{-(t-3H)/\tau_4}) \ 3H \le t \le 4H. \tag{14}$$

Like the spill transition, the time constant, $\tau_4$, for the sensing transition, $$\tau_4 = \frac{R_{24}}{(A+1)}\left(C_{p2} + \frac{C_2(C_1 + C_{pl})}{C_1 + C_2 + C_{pl}}\right), \tag{15}$$

is a factor of (A+1) times faster than that of a circuit where the $f_b$ signal is held at a constant bias.

Since $v_f$ is floating during phase 4, it rises in response to the level $$v_f(t) = v_f(3H) + (f_g(t) - f_g(3H))\frac{C_2}{C_1 + C_{pl} + C_2} \ 3H \le t \le 4H. \tag{16}$$

In contrast to $f_g$, the value of $v_f$ at the end of the sensing phase differs from its precharged value.

After the sensing path is closed, $f_g$ remains floating for the remainder of the cycle at a level $$f_g(4H) = \left(\frac{AV_r - v_{th}}{A+1}\right). \tag{17}$$

The feedback signal $f_b$ remains at the voltage $$f_b(4H) = \left(\frac{A}{A+1}\right)(V_r + v_{th}). \tag{18}$$

Current $I_s$ is integrated in both the primary and secondary output wells over the sensing and collection phases. The sum of these two packets represents the final output, $$Q_o = (f_g(4H) - f_g(2H+\Delta))\left(C_{p2} + \frac{(C_1 + C_{pl})C_2}{C_1 + C_2 + C_{pl}}\right). \tag{19}$$

Combining Eqs. 19, 14 and 10, and retaining only the most significant terms yields the result $$Q_o = V_s C_1 \frac{C_2}{C_1 + C_2 + C_{pl}} + \left(\left(\frac{AV_r - v_{th}}{A+1}\right)(e^{-H/\tau_4} - e^{-H/\tau_2}) - V_p e^{-H/\tau_2} + (V_h' - v_{th}')e^{-H/\tau_4}\right)\left(C_{p2} + \frac{(C_1 + C_{pl})C_2}{C_1 + C_2 + C_{pl}}\right). \tag{20}$$

When the assumptions $H \gg \tau_2$, $H \gg \tau_4$, and $C_{p1}=0$ apply, the result in Eq. 20 is simplified to $$Q_o = V_s\left(\frac{C_1 C_2}{C_1 + C_2}\right). \tag{21}$$

This depends only on the sampled input signal and on $C_1$ and $C_2$. Although $v_{th}$, A, and $V_r$ determine the precharge and sensing values of this circuit in Eqs. 1 and 14, they do not impact the result in Eq. 21 because both precharge and sensing are performed with respect to these same values. Matching between different circuits does not depend critically on any of these parameters.

Spill and sensing transitions in a DDS circuit are, to a good approximation, performed to completion and the approximations $H \gg \tau_2$, $H \gg \tau_4$ are nearly always valid. The values of $f_g$ at the end of the spill and sensing phases are then equal, speed-dependent distortion can be eliminated, and parasitic capacitance, $C_{p2}$, has no impact on the output.

None of the bias voltages $V_d$, $V_c$, $V_h$, $V_r$, or $V_p$ influence the result in Eq. 21. Bias $V_p$ should be low enough that charge can fill the region underneath $G_{24}$ during the fill operation. Any level, such as ground, that is less than $V_h - v_{th}$ is acceptable. Bias $V_d$ should be high enough that it can remove electrons from $f_g$ during the spill operation. It is typically held at the most positive supply. The level of $V_c$ must be high enough that $v_f(3H)$ remains greater than zero for all possible values of $V_s$. Similarly, the levels of $V_h$ and $V_r$ must be high enough that $f_g(3H)$, given by Eq. 12, remains greater than zero at all times.

The DDS charge generator 300 of FIG. 3A includes two blocks: a sample-and-hold front end, and a dynamic double-sampling core. The purpose of the sample-and-hold block is to produce a displacement charge proportional to the analog input voltage, $v_i$. The purpose of the DDS core is to integrate this displacement charge in a CCD output well. The DDS technique can also be applied to a number of other circuit functions, in addition to charge generation. In this approach, the sample-and-hold block is removed and an alternative source of electrons is provided to the DDS input. Examples of such circuits, including wire transfer, charge sensing, charge subtraction, and D/A conversion are presented hereinafter.

Figure 6A:
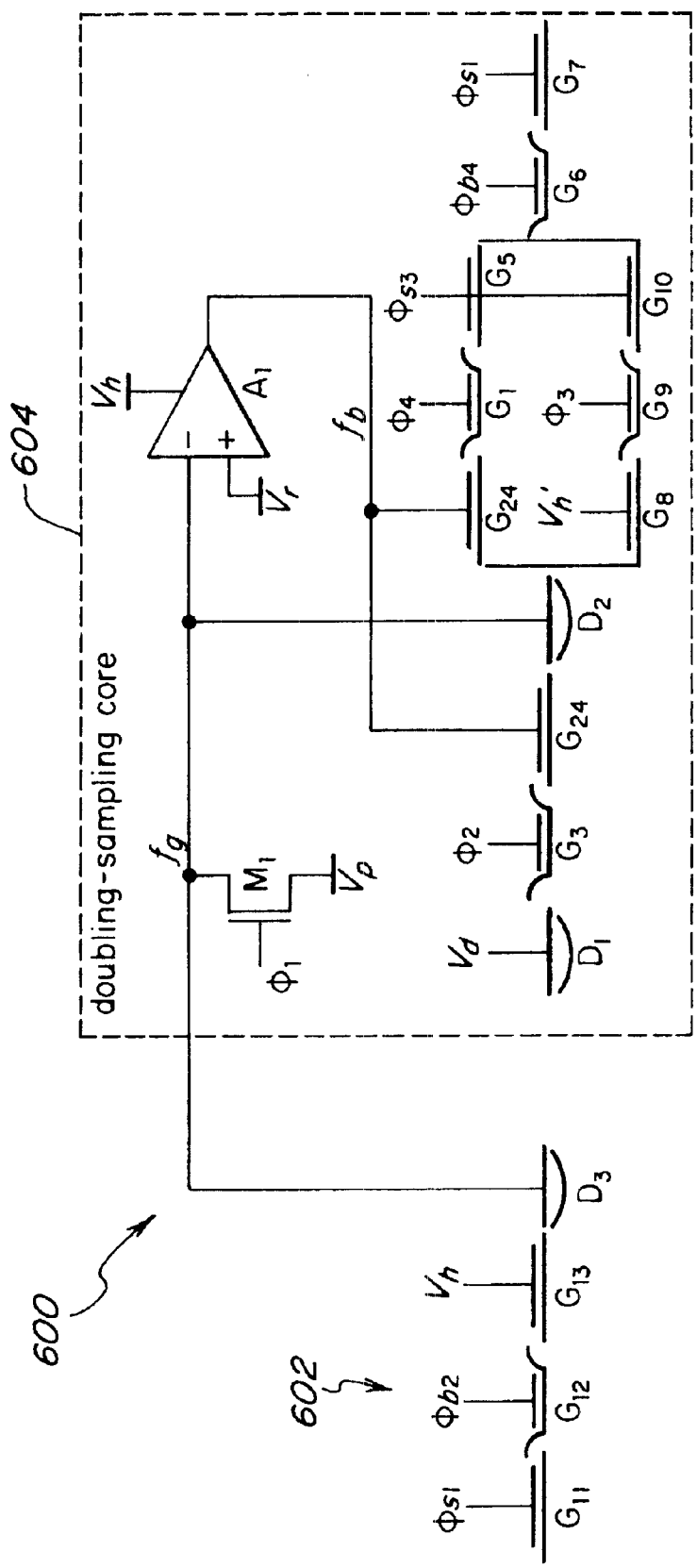
FIG. 6A is a schematic diagram of an exemplary embodiment of a DDS wire transfer circuit.

Wire transfer circuits provide an additional degree of flexibility by allowing charge packets to be transferred between nonadjacent or distant wells, via a metal line. To incorporate dynamic double sampling into a wire transfer circuit, the output from a CCD register is connected to the input of a DDS core as shown in FIG. 6A. FIG. 6A is a schematic diagram of an exemplary embodiment of a DDS wire transfer circuit 600. FIGS. 6B–6E are associated energy level diagrams for a fill phase, spill phase, collection phase and sensing phase, respectively. A CCD register 602, formed by gates $G_{11}$, $G_{12}$, and $G_{13}$, serves as the source of electrons. A DDS core unit 604 reconstructs incoming charge packets by integrating their electrons in a receiving well.

The operation of the circuit 600 is similar to that of the DDS charge generator 300. It is illustrated using the energy level diagrams of FIGS. 6B–6E. During the fill phase, a new supply of charges is provided to the circuit when $f_g$ is pulled low to $V_p$. Gate $G_{12}$ is off at this time to prevent charge from flooding backward into the source register. During the spill phase, $f_g$ is reset high to a level of $$f_g(2H) = V_p e^{-H/\tau_2} + \left(\frac{AV_r - v_{th}}{A+1}\right)(1 - e^{-H/\tau_2}). \quad (22)$$

The time constant for this transition is $$\tau_2 = \frac{R_{24} C_{p2}}{(A+1)}, \quad (23)$$

where $C_{p2}$ represents parasitic junction and routing capacitances on $f_g$ as well as channel capacitance of gates $G_{24}$, $G_8$, and $G_{13}$.

During the collection phase, a quantity of charge $Q_s$ is transferred onto $f_g$ by lowering the potential of $G_{11}$. The potential on $f_g$ falls in response, and charge flows through the secondary sensing path, into the secondary receiving well $G_{10}$. The voltage on $f_g$ is restored to a high level of $$f_g(3H) = \left(f_g(2H) + \frac{Q_s}{C_{p2}}\right) e^{-H/\tau_3} + (V_h' - v_{th}')(1 - e^{-H/\tau_3}). \quad (24)$$

During the sensing phase, charge, any remaining on the wire transfer node, flows through $G_{24}$ to the primary output well, $G_5$. The final value of $f_g$ is $$f_g(4H) = f_g(3H) e^{-H/\tau_4} + \left(\frac{AV_r - v_{th}}{A+1}\right)(1 - e^{-H/\tau_4}). \quad (25)$$

The time constant for the sensing transition, $\tau_4$, equals that for the spill transition, $\tau_2$.

Combining Eqs. 22, 24 and 25, and eliminating higher-order exponential terms, yields the resultant charge packet $$Q_o = Q_s - (V_h' - v_{th}' + V_p) e^{-H/\tau_4} C_{p2}. \quad (26)$$

In most cases, the approximation $H \gg \tau_4$ is valid for this circuit and the first term, which represents a constant offset, is negligible. The result is then identically equal to the input $Q_s$, regardless of any parasitic capacitances.

Figure 7A:
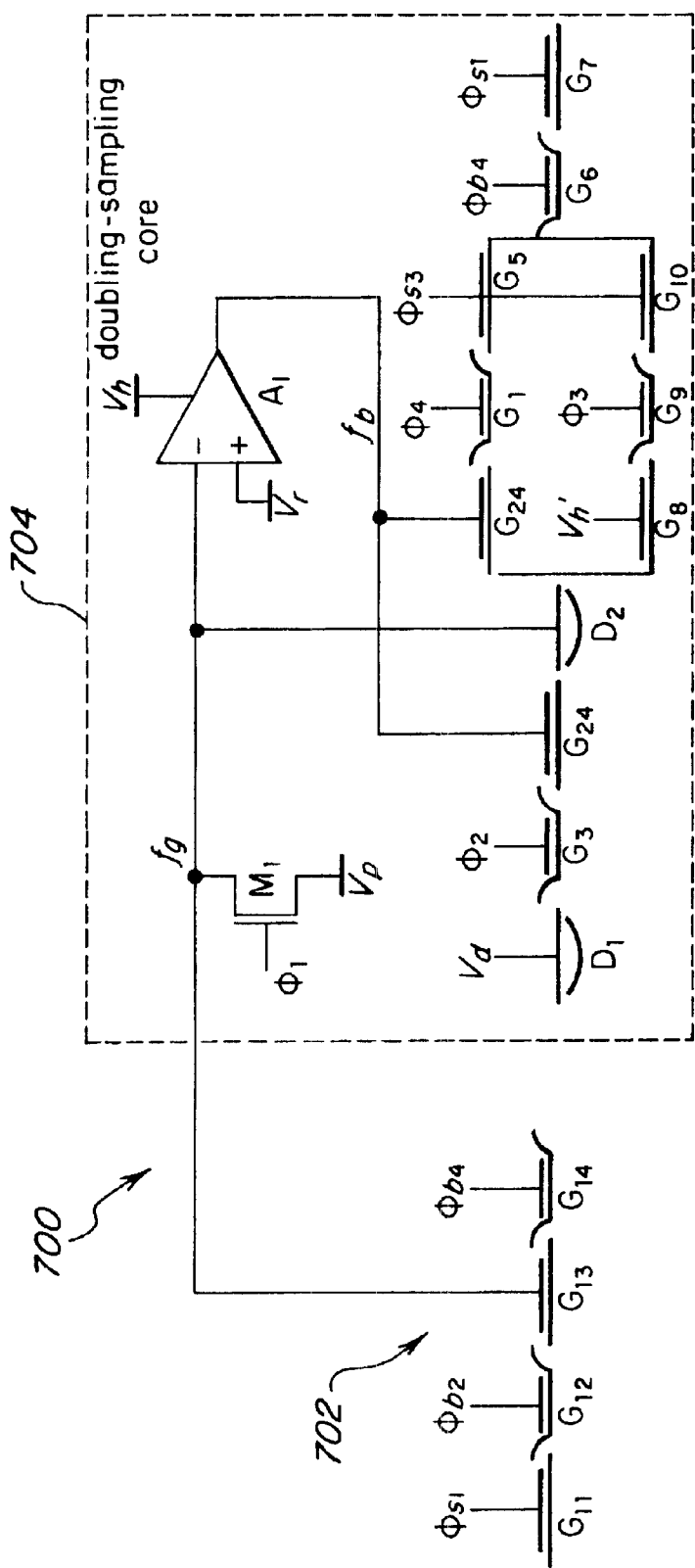
FIG. 7A is a schematic diagram of an exemplary embodiment of a DDS sensing circuit with charge output in accordance with the invention.

Nondestructive charge sensing is used when a charge packet must be used multiple times. It replicates the original packet in either charge or voltage form, but does not alter the original in the process. The dynamic double-sampling technique can be applied to nondestructive charge sensing. FIG. 7A is a schematic diagram of an exemplary embodiment of a DDS sensing circuit 700 with charge output in accordance with the invention. FIGS. 7B–7E are associated energy level diagrams for a fill phase, spill phase, collection phase and sensing phase, respectively.

The circuit 700 is configured by connecting floating gate $G_{13}$ from within a CCD register 702, to the input of a DDS core unit 704. Input charge is provided by coupling signal electrons from the floating gate channel to the DDS sensing node. These carriers are integrated in a CCD well by the DDS core unit to reconstruct the original charge packet.

The operation of circuit 700 occurs as follows. During the fill phase, $f_g$ is pulled low to $V_p$. This serves two purposes. First, it provides a new supply of electrons to the DDS core unit 704. Second, it presets the floating gate low and forces electrons, underneath it from a previous cycle, to be transferred forward.

During the spill phase, $f_g$ is preset high to a level of $$f_g(2H) = V_p e^{-H/\tau_2} + \left(\frac{AV_r - v_{th}}{A+1}\right)(1 - e^{-H/\tau_2}). \quad (27)$$

The time constant for this transition is $$\tau_2 = \frac{R_{24}}{(A+1)}\left(C_{p2} + \frac{C_{gc} C_{cs}}{(C_{gc} + C_{cs})}\right), \quad (28)$$

where $C_{p2}$ represents parasitic junction and routing capacitances on $f_g$ as well as channel capacitance of $G_{24}$ and $G_8$. The second term in this expression corresponds to effective capacitance of the CCD well when it is empty. The high potential on the floating gate at this time leaves it well situated to receive charge during the following phase.

At the beginning of the collection phase, the floating gate well contains no charge. Its storage capacity, which is proportional to the difference between the channel potentials of $G_{13}$ and $G_{12}$, is approximately equal to $$|Q|_{max}=(V_r-v_{th1}-4+v_{th2})(C_{gc}+C_{cs}). \quad (29)$$

Variables $v_{th1}$ and $v_{th2}$ refer to threshold voltages of the first and second level gates and 4V represents the high level of the $\phi_{b2}$ clock. A quantity of charge $Q_s$ is transferred underneath the floating gate by lowering the potential of $G_{11}$. The floating gate potential falls temporarily in response and its storage capacity is reduced to approximately $$|Q|_{max} = \left(V_r + Q_s\left(\frac{C_{gc}}{C_{gc}C_{p2} + C_{cs}(C_{gc} + C_{p2})}\right)\left(\frac{C_{gc}}{C_{gc} + C_{cs}}\right) - v_{th1} - 4 + v_{th2}\right)(C_{gc} + C_{cs}). \quad (30)$$

When $Q_s$ is large, this reduction in storage capacity may cause some electrons to be temporarily stored underneath the $G_{12}$ barrier, where they are no longer sensed by the floating gate. However, as charge flows through the secondary sensing path, the voltage on $f_g$ rises, storage capacity is restored, and electrons are once again confined to the floating gate. At the end of collection, the level on the floating gate is $$f_g(3H) = \left(f_g(2H) + Q_s\frac{C_{gc}}{C_{gc}C_{p2} + C_{cs}(C_{gc} + C_{p2})}\right)e^{-H/\tau_3} + (V'_h - v'_{th})(1 - e^{-H/\tau_3}). \quad (31)$$

During the sensing phase, any charge that remains on $f_g$ is passed to the primary output well, and the potential on $f_g$ rises to its final value of $$f_g(4H) = f_g(3H)e^{-H/\tau_4} + \left(\frac{AV_r - v_{th}}{A+1}\right)(1 - e^{-H/t_4}). \quad (32)$$

The time constant for this transition is $$\tau_4 = \frac{R_{24}}{(A+1)}(C_{p2} + (C_{gc} + C_{cs})FK_{eff}), \quad (33)$$

The factor $FK_{eff}$ is used to translate storage capacity into effective capacitance seen by the gate.

Combining Eqs. 27, 31 and 32, and eliminating higher-order exponential terms, yields the resultant charge packet $$Q_o = Q_s\frac{C_{gc}}{C_{gc} + C_{cs}} - (V'_h - v'_{th} + V_p)e^{-H/\tau_4}C_{p2}. \quad (34)$$

In most cases, the approximation $H \gg \tau_4$ is valid and this expression can be simplified to $$Q_o = Q_s\frac{C_{gc}}{C_{gc} + C_{cs}}. \quad (35)$$

The output packet depends on capacitances of the CCD well, but does not depend on parasitics on the floating gate node.

Figure 8A:
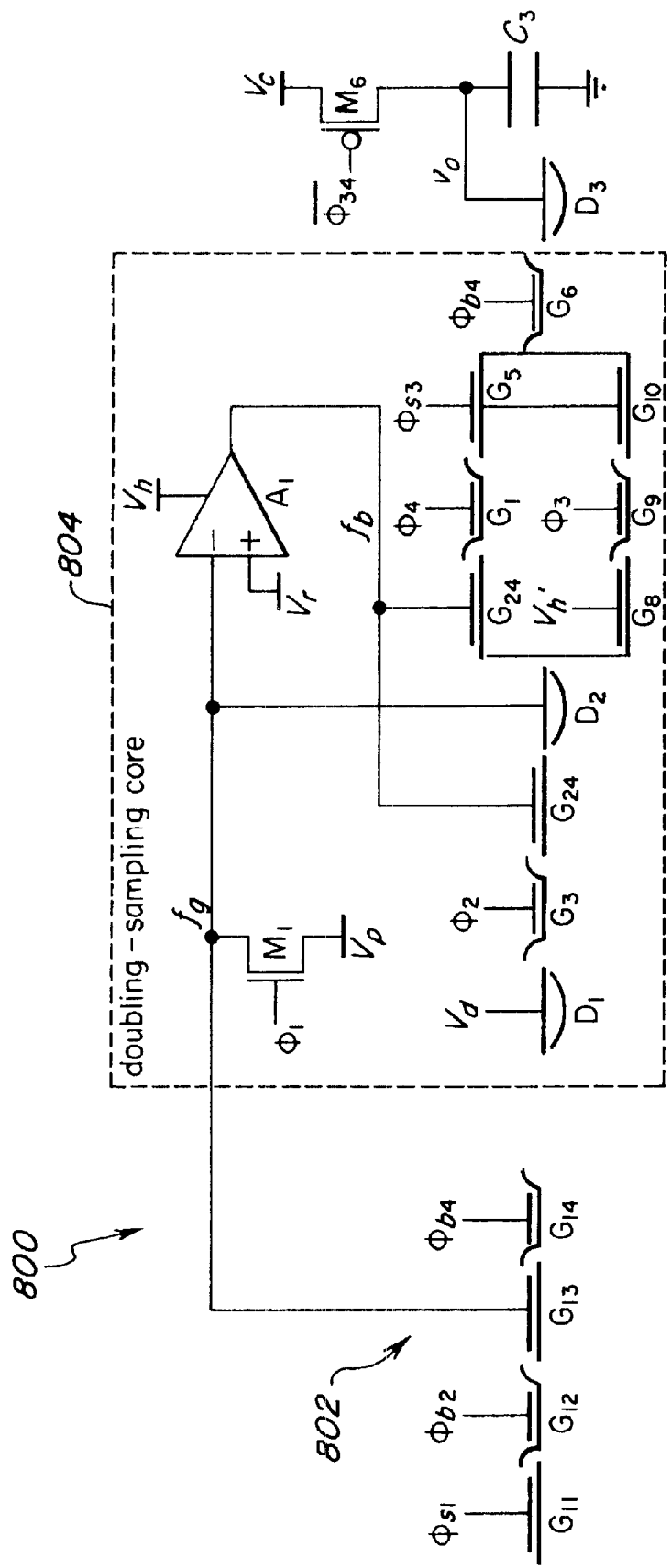
FIG. 8A is a schematic diagram of an exemplary embodiment of a DDS charge sensing circuit with voltage output in accordance with the invention.

The nondestructive sensing circuit 700 of FIG. 7A produces an output charge that is a replica of its input packet. A modified version of this circuit, shown in FIG. 8A, can be used to produce an output voltage instead. FIG. 8A is a schematic diagram of an exemplary embodiment of a DDS charge sensing circuit 800 with voltage output in accordance with the invention. FIGS. 8B–8E are associated energy level diagrams for a fill phase, spill phase, collection phase and sensing phase, respectively. The circuit 800 is configured by connecting floating gate $G_{13}$ from within a CCD register 802, to the input of a DDS core unit 804.

In the configuration of circuit 800, the final well $G_7$ that was otherwise used to store the result, is replaced by a capacitor, $C_3$. In this circuit, charge packets described by Eq. 35 are generated and stored in the wells of $G_5$ and $G_{10}$. During phases 3 and 4, the output node $v_o$ is precharged to $V_c$. During phase 1, the result is transferred onto $v_o$ by lowering the potential of $G_5$ and $G_{10}$. The potential on $v_o$ after all charge has transferred is given by $$v_o = V_c + \frac{Q_s}{C_3}\frac{C_{gc}}{C_{gc} + C_{cs}}. \quad (36)$$

One advantage of DDS charge sensing is that it has the same voltage requirements as a simple CCD register because its floating gates are clocked to the same levels as other CCD gates. Two other advantages of DDS charge sensing are that it provides greater storage capacity in its floating gate wells and permits a large output voltage swing. Signals are converted to voltages on the output $v_o$, rather than within the CCD register. Storage capacity is also improved because the floating gate is a virtual ground and output swing does not reduce storage capacity.

An operation that is commonly required in A/D conversion is subtraction of the output from a multiplying D/A from an incoming analog signal. DDS circuit techniques can be used to perform this function. In a DDS approach, an input quantity of positive charge, generated through capacitor elements, is combined on a wire with an incoming packet of negative charge, from a CCD register. The D/A full scale can be either a time-varying voltage or a constant reference voltage. Since diffusions are necessary on the wire, the operation is nondepleted and subject to thermal noise, coupling, and clock feedthrough. However, DDS subtraction has the advantage that its positive charge is formed through polysilicon capacitors. These capacitors provide good element-to-element matching and low voltage dependence, which is important if the D/A full-scale is a time varying signal. DDS subtraction also has the advantage that its incoming negative signal is not subject to nonlinearities due to capacitor voltage dependence.

Figure 9A:
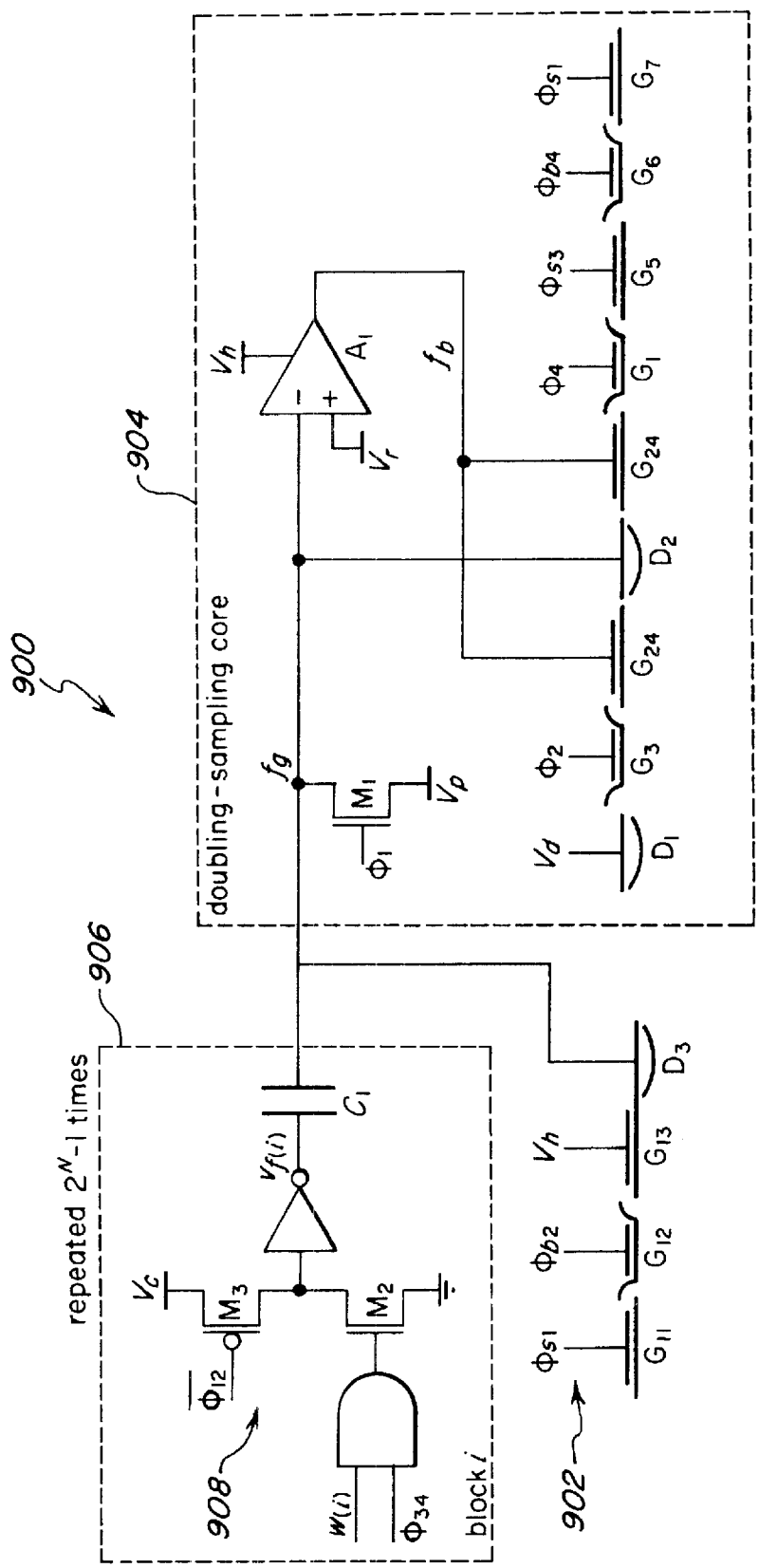
FIG. 9A is a schematic diagram of an exemplary embodiment of a DDS D/A and subtraction circuit in accordance with the invention.
Figure 9B:
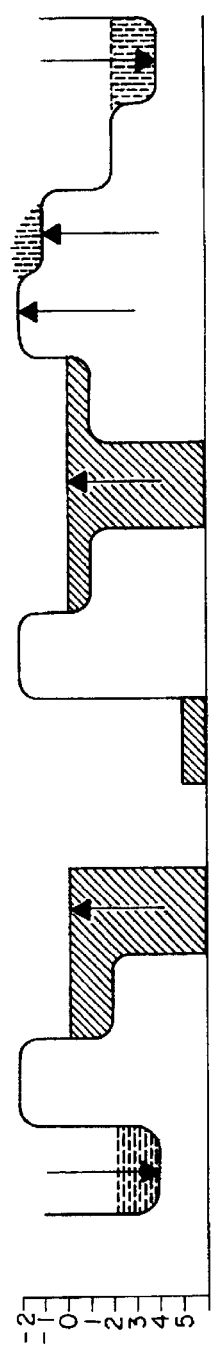
FIGS. 9B–9E are associated energy level diagrams for a fill phase, spill phase, collection phase and sensing phase, respectively.
Figure 9C:
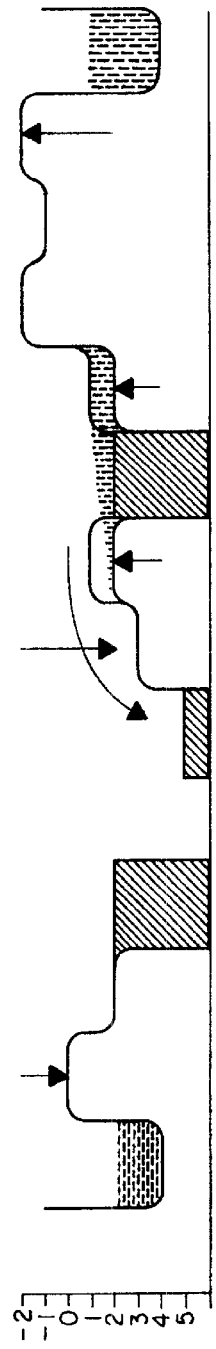
Figure 9D:
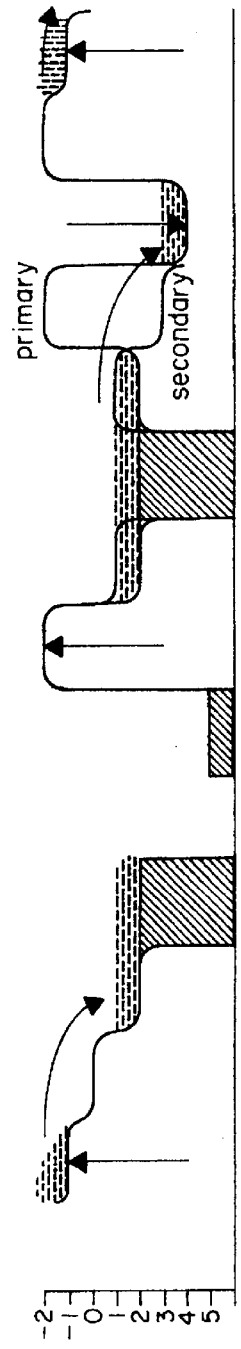
Figure 9E:
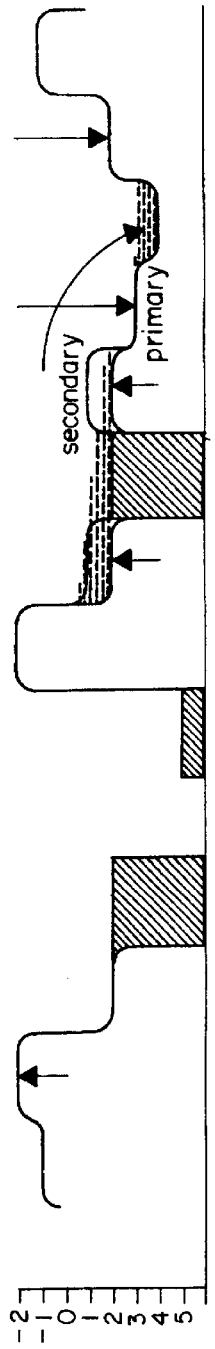

A circuit for performing this function is shown in FIG. 9A. FIG. 9A is a schematic diagram of an exemplary embodiment of a DDS D/A and subtraction circuit 900 in accordance with the invention. FIGS. 9B–9E are associated energy level diagrams for a fill phase, spill phase, collection phase and sensing phase, respectively.

A CCD register 902, formed by gates $G_{11}$, $G_{12}$, and $G_{13}$, serves as the source of electrons. Its output is connected to the input of a DDS core unit 904. N-bit D/A conversion is performed by an array of $(2^N-1)$ identically sized units 906, each one consisting of a clamp-and-sample circuit 908 in series with a capacitor $C_1$. The D/A elements provide positive charge to the input of the DDS core unit. The resulting combination of negative and positive charge is integrated in receiving well $G_5$. The DDS core of this circuit differs from that used for charge generation in that the secondary sensing path is eliminated.

The operation of this circuit is similar to that of the DDS wire transfer described earlier. During the fill phase, $f_g$ is pulled low to $V_p$ to provide a new supply of electrons to the circuit. Gate $G_{12}$ is off at this time to prevent charge from flooding backward into the source register. Meanwhile the array of signals $v_j(i)$, within the D/A, is forced low by the precharge through $M_3$.

The D/A precharge remains on during the spill phase. Node $f_g$ is reset to a level of $$f_g(2H) = V_p e^{-H/\tau_2} + \left(\frac{AV_r - v_{th}}{A+1}\right)(1 - e^{-H/\tau_2}). \quad (37)$$

The time constant for this transition is $$\tau_2 = \frac{R_{24}((2^N - 1)C_1 + C_{p2})}{(A+1)}. \quad (38)$$

Capacitor $C_{p2}$ represents parasitic junction and routing capacitances on $f_g$ as well as channel capacitance of $G_{24}$ and $G_{13}$.

During the collection phase, a quantity of charge $Q_s$ is transferred onto $f_g$ by lowering the potential of $G_{11}$. At the same time, the digital inputs w(i), which are in a thermometer code format, are used to selectively assert some of the signals $v_j(i)$. When w(i) is high, a positive transition of $V_c$ is introduced across $C_1(i)$. When w(i) is low, the capacitor voltage remains unchanged. Electrons, from the source register, are cancelled by positive displacement charge, and $f_g$ is restored to a higher voltage. The resulting potential on $f_g$ from the combination of these competing effects is $$f_g(3H) = f_g(2H) + \frac{Q_s + \sum_{i=0}^{2^N-1} w(i)C_1 V_c}{((2^N - 1)C_1 + C_{p2})}. \quad (39)$$

During the sensing phase, the net charge on $f_g$ flows through $G_{24}$ to the output well, and the potential on $f_g$ rises to its final value of $$f_g(4H) = f_g(3H) e^{-H/\tau_4} + \left(\frac{AV_r - v_{th}}{A+1}\right)(1 - e^{-H/\tau_4}). \quad (40)$$

The time constant for the sensing transition, $\tau_4$, equals that for the spill transition, $\tau_2$.

Combining Eqs. 37, 39 and 40, and eliminating higher-order exponential terms, yields the resultant charge packet $$Q_o = \left(Q_s + \sum_{i=0}^{2^N-1} w(i)C_1 V_c\right)(1 - e^{-H/\tau_4}) - \quad (41)$$

$$\left(\frac{AV_r - v_{th}}{A+1} - V_p\right)e^{-H/\tau_4}((2^N - 1)C_1 + C_{p2}).$$

The approximation $H \gg \tau_4$ is nearly always valid for this circuit and the first term, which represents a constant offset, is negligible. The result is then identically equal to the difference between the input charge $Q_s$ and the D/A displacement charge, regardless of parasitics on the wire transfer node, $f_g$.

A pair of DDS sensing circuits 700 can also be used to implement comparison. In this approach, two differential input packets are each replicated, using a DDS replicator circuit. The resulting packets are stored in CCD receiving wells and are translated to voltages at the input to a CMOS comparator during the following phase. This circuit can also incorporate differential amplification and common-mode rejection in the charge domain using the feedback techniques.

The resolution of this technique is greater than that for a configuration that performs charge-to-voltage translation on the floating gates. First, it supports a larger signal range so that the impact of comparator or amplifier input-offset voltages is reduced. Second, matching in the charge-to-voltage translation is improved because gains are determined by polysilicon capacitors and are only weakly dependent on CCD well capacitances.

Although the present invention has been shown and described with respect to several preferred embodiments thereof, various changes, omissions and additions to the form and detail thereof, may be made therein, without departing from the spirit and scope of the invention.

What is claimed is:

1. A charge processing circuit which integrates charge at an output node that is representative of an input charge provided at an input node, comprising:

a precharge path coupled to said input node, said precharge path operable for setting the potential of said input node to a fixed precharge potential prior to introduction of input charge to said input node;

a sensing path coupled to said input and output nodes which is operable for returning the potential of said input node to said fixed precharge potential subsequent to introduction of input charge to said input node; and a feedback element having an input coupled to said input node and an output coupled to said sensing path and said precharge path, said feedback element operable for setting said fixed precharge potential.

2. The circuit of claim 1, wherein said output node comprises a CCD receiving well.

3. The circuit of claim 1, wherein said precharge path comprises a first gate coupled to said feedback element and a second gate coupled to a first clocked potential source, and wherein said sensing path comprises a third gate coupled to said feedback element and a fourth gate coupled to a second clocked potential source.

4. The circuit of claim 1 further comprising a source of said input charge, said source comprising a capacitor having an output coupled to said input node, and an input coupled to a circuitry that changes the potential across the capacitor.

5. The circuit of claim 1 further comprising a source of said input charge, said source comprising a CCD register that transfers charge onto said input node.

6. The circuit of claim 1 further comprising a first and second source of said input charge.

7. The circuit of claim 6, wherein said first source comprises a CCD register that transfers charge onto said input node.

8. The circuit of claim 7, wherein said second source comprises one or more capacitors having their outputs coupled to said input node and their inputs coupled to circuitry that changes the potential across said capacitors.

9. A method of integrating charge at an output node of a charge processing circuit that is representative of input charge provided at an input node, comprising:

replenishing charge at said input node;

draining charge from said input node;

stopping the draining of charge from said input node in response to a feedback element detecting when said input node reaches a fixed precharge potential;

introducing an input charge on said input node from a source;

draining charge from said input node onto said output node; and stopping the draining of charge from said input node in response to a feedback element detecting when said input node reaches said fixed precharge potential.

* * * * *